United States Patent [19]

McLean et al.

[11] Patent Number: 5,721,776
[45] Date of Patent: Feb. 24, 1998

[54] TELEPHONE LINE CONNECTOR

[75] Inventors: Kenneth W. McLean; Barry K. Klassen; Edward Chu; Michael A. Tenace, all of Calgary; Scott B. Campbell, Airdrie, all of Canada

[73] Assignee: Northern Telecom Limited, Montreal, Canada

[21] Appl. No.: 619,224

[22] Filed: Mar. 21, 1996

[51] Int. Cl.$^6$ .................................................. H04M 1/00
[52] U.S. Cl. .......................... 379/438; 379/435; 379/436
[58] Field of Search .................................. 379/428, 429, 379/438, 441, 435, 436, 447; 439/638, 676, 76.1; 455/89, 90

[56] References Cited

U.S. PATENT DOCUMENTS 5,303,292   4/1994   Takahashi et al. .................... 379/435

Primary Examiner—Jack Chiang
Attorney, Agent, or Firm—R. J. Austin

[57] ABSTRACT

A telephone line connector for location between a telephone and a plurality of outlet sockets and in which the connector is connectable to a power cable. The connector has a plurality of input signal sockets and a common signal and power output socket. A pair of power input terminals are connected to the common socket. The common socket also has pairs of signal output terminals connected in such a way that the connector through the input signal sockets is connectable to a plurality of wall outlets, each of which may have a single pair or a plurality of pairs of lines connected to it. The connector is thus capable of transferring all of those lines, as required, to a telephone together with power.

2 Claims, 2 Drawing Sheets

TELEPHONE LINE CONNECTOR

This invention relates to telephone line connectors.

Telephones are supplied with a signal line and a power line. Some analog telephones are equipped to receive two or more signal lines. One conventional method of providing two or more signal lines is to provide a number of telephone signal wall sockets corresponding to the lines and to connect these wall sockets by separate cables to individual signal sockets in a telephone. As may be seen, this results, in a multi-line analog phone, in an inconvenient number of signal cables extending across a desk or other support surface and this number is increased by the use of a separate power cable. In another conventional method, a wall socket is itself connected to two or more signal lines and a single cable carrying all of these lines is then connected to the multi-line analog phone.

There is presently available a telephone connector which is used in conjunction with a plurality of signal lines arriving at a corresponding number of wall sockets in order to deliver the signal lines in a single cable to an analog telephone. The power cable extends separately to the phone. This particular telephone connector is extremely limited in its application and may be used solely in the manner indicated in this paragraph.

The present invention provides a telephone line connector which has a more universal use than the presently available structure.

Accordingly, the invention provides a telephone line connector for in-series insertion between a telephone and a plurality of telephone outlet sockets, the connector comprising a housing, a common signal and power output socket, and a plurality of input signal sockets carried by the housing, the housing also carrying power input terminals electrically interconnected with a pair of power output terminals of the common signal and power output socket, the common signal and power output socket also having a plurality of pairs of signal output terminals each of which is interconnected with a pair of signal input terminals of each of the signal sockets and with at least two of these pairs of signal output terminals each electrically interconnected with an individual pair of a corresponding number of terminal pairs of a chosen one of the signal input sockets.

In use of the connector according to the invention, a wall outlet which is supplied with a plurality of pairs of signal lines may have all of those lines connected by a signal input socket of the connector to the common signal and power output socket for connection to an analog telephone. This form of connection may be made together with a) any other signal line connected to a signal input socket of the connector; and b) a power line. It follows therefore that, dependent upon design, the connector of the invention is, for example, capable of connection to a power line in conjunction with a) a single wall outlet having two, three or more signal lines connected to it; b) a plurality of wall outlets each connected to a single signal line; or c) a single wall outlet having two, three or more signal lines and at least one wall outlet connected to a single signal line. It is even possible to connect a single wall outlet having two, three or more signal lines to one chosen signal input socket and another wall outlet similarly provided with a plurality of signal lines for connection to another signal input socket of the connector.

In addition, the invention includes in combination, a telephone line connector and a telephone base, the connector comprising a housing, a common signal and power output socket and a plurality of signal input sockets carried by the housing, the housing also carrying power input terminals electrically interconnected with a pair of terminals of the common signal and power output socket, the common signal and power output socket also having a plurality of pairs of signal output terminals each of which is interconnected with a pair of signal input terminals of each of the signal input sockets and with at least two of these pairs of signal output terminals each electrically interconnected with an individual pair of a corresponding number of terminal pairs of at least a chosen one of the signal input sockets; and the telephone base comprises a station for receiving the telephone line connector, and a common signal and power input socket for connection to the common power and signal output socket of the line connector.

The combination according to the invention is particularly useful for the telephone base forming part of telephone which is to be wall mounted. Thus, the connector may be received in a recess in the rear surface of the base with all of the signal and power lines extending to the connector. The connector may be connected to the connection of the telephone by a short cable or the connection may itself form a plug for insertion directly into the common power and signal socket of the connector.

Embodiments of the invention will now be described, by way of example, with reference to the accompanying drawings, in which.

Figure 1:
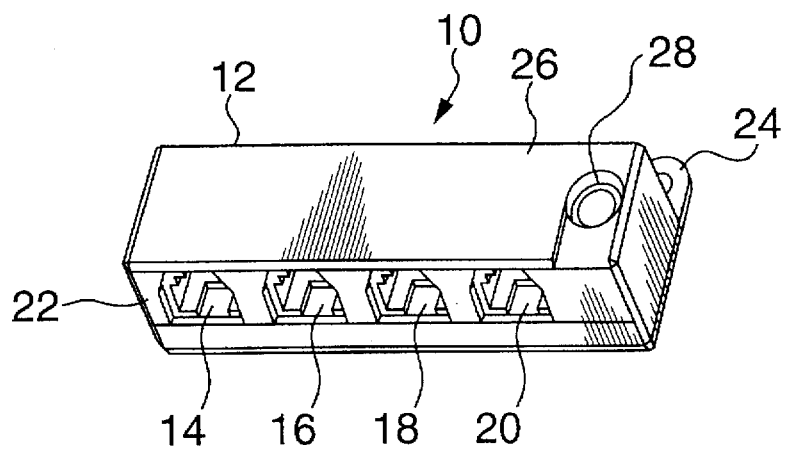
FIG. 1 is a perspective view of a telephone line connector according to a first embodiment.

As shown in FIG. 1, a telephone line connector 10 comprises a housing 12 with four in-line sockets or jacks 14, 16, 18 and 20 facing outwardly from a front wall 22 of the connector. A rear wall (not shown) of the connector is provided with lugs 24 extending outwardly from the housing by which the connector may be mounted by screws upon a wall or other supporting structure. An upper wall 26 of the housing 12 is provided with a port 28 for an incoming power cable (not shown in FIG. 1). This port may, of course, be provided in any other suitable wall and the sockets 14, 16, 18 and 20 may, in fact, be positioned in different walls and consequently be non-aligned if a particular design requires such change.

The sockets 14, 16, 18 and 20 are of conventional design, each having cantilever terminal strips for contact with conventional plugs in known manner.

Figure 2:
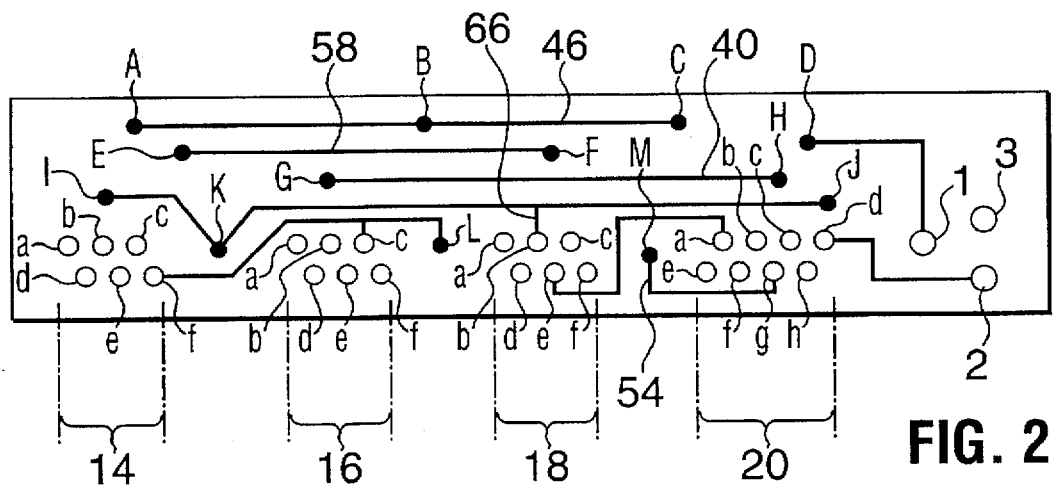
FIG. 2 is a plan view of one side of a printed circuit board inside the connector of the first embodiment.
Figure 3:
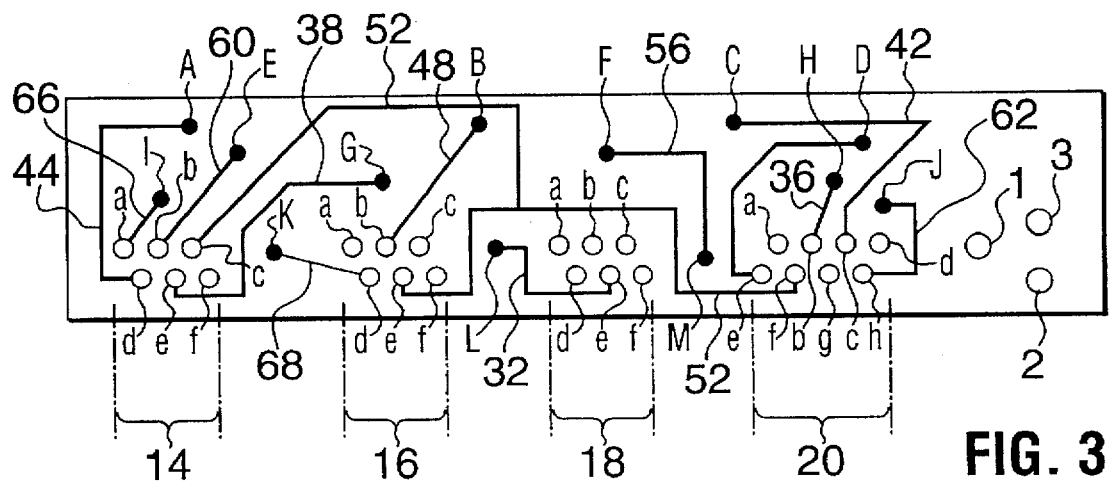
FIG. 3 is a mirror image of the other side of the printed circuit board.

The socket 20 is a common signal and power output socket for connection to an analog telephone as will be described. The sockets 14, 16 and 18 are for connection exteriorly of the connector to wall sockets and for connection within the connector and in specific manner, to the common signal and power output socket 20 together with power conductors connected to the incoming power cable. Specifically, FIGS. 2 and 3 illustrate the construction and circuitry of a printed circuit board which is mounted within the housing 12 and forms part of the connector. The circuitry of the board is provided on two sides of the board and for this purpose, FIG. 2 is a plan view on one side of the board and FIG. 3 is a mirror image of the other side of the board to enable a person skilled in the art to follow the circuitry through the board without inconvenience. The sockets 14, 16, 18 and 20 have pin terminals plugged into terminal holes in the board. The terminal holes are thus arranged in groups on the printed circuit board. For convenience in the following discussion, each group of holes bears the reference number of the socket with which it is associated. Each of the terminal hole groups 14, 16 and 18 has six terminal holes and the group 20 for the common signal and power output socket has eight terminal holes as shown in FIGS. 2 and 3. In each of these groups, each terminal hole is identified alphabetically to distinguish it from others for the purposes of the description. In addition, the printed circuit board is provided with a plurality of through holes or vias for the purpose of transferring circuitry paths from one side of the board to the other. These vias are identified by capitalized alphabetical letters from 'A' to 'M'.

As may be seen from FIG. 2, rectangular power socket input terminals 1 and 2 of the printed circuit board which are electrically connected to terminals (not shown) for the power cable are connected respectively to opposite end terminal holes 'e' and 'd' of the terminal hole group 20. Connection from terminal 1 is made through via 'D' as shown in FIGS. 2 and 3 to the terminal hole 'e'. Rectangular terminal 3 is a ground for the power cable. Terminal hole 20a is connected by conductor to terminal hole 18e on one side of the board as shown in FIG. 2 and also to terminal holes 16c and 14f which are connected to terminal hole 18e by conductors 32 and 34 interconnected through via 'L'. Terminal 20b is connected to terminal 14e by conductor 36 connecting terminal hole 20b with via 'H' and conductor 38 between terminal hole 14e and terminal 'G' in FIG. 3, a further interconnecting conductor 40 extending between vias 'G' and 'H' as shown in FIG. 2. Terminal hole 20c is connected to terminal hole 14d by a conductor 42 extending from hole 20c to via 'C' and conductor 44 extending from terminal 14d to via 'A' as shown in FIG. 3, with an interconnecting conductor 46 extending between vias 'A' and 'C' while being connected with via 'B'. Via 'B', as shown in FIG. 3, is also connected by conductor 48 with terminal hole 16b. Further, terminal hole 20f is connected to terminal holes 14c and 16e on the one side of the board by conductors 50 and 52 as shown in FIG. 3. In addition terminal hole 20g extends by conductor 54 (FIG. 2) to via 'M' and by conductor 56 in FIG. 3 to via 'F'. The conductor 56 is interconnected between vias 'F' and 'E' by conductor 58 on the FIG. 2 side of the board with a final conductor 60 of the series extending as shown, in FIG. 3 from via 'E' to the terminal hole 14b. Finally, terminal hole 20h extends to via 'J' by conductor 62 (FIG. 3) and a further conductor 64 as shown in FIG. 2 extends from via 'J' to vias 'K' and 'I'. A short conductor 66 extends from conductor 64 to terminal hole 18b. Conductors 66 and 68 extend from vias 'I' and 'K' on the FIG. 3 side of the board, respectively, to terminal holes 14a and 16d.

With the circuitry described above, the signal and power output socket 20 is connected to each of the other sockets and to the power cable in the manner shown in Table I.

TABLE I

| Signal & Power Socket Terminals | Socket 18 Terminals | Socket 16 Terminals | Socket 14 Terminals | Power |
|---|---|---|---|---|
| 20a | 18e | 16c | 14f | |
| 20b | | | 14e | |

TABLE I-continued

| Signal & Power Socket Terminals | Socket 18 Terminals | Socket 16 Terminals | Socket 14 Terminals | Power |
|---|---|---|---|---|
| 20c | | 16b | 14d | |
| 20d | | | | P |
| 20e | | | | P |
| 20f | | 16e | 14c | |
| 20g | | | 14b | |
| 20h | 18b | 16d | 14a | |

As may be seen from Table I, two of the terminal holes 20d and 20e are connected to conductors of the power cable. The other terminals 20a to c and 20f to h are connected one to each of the six terminals of the terminal set 14 so that the socket 14 has three sets of conductors extending to the signal and power output socket. In addition, as may be seen from FIGS. 2 and 3, socket 16 is connected by two pairs of conductors to the terminals of the signal and power output socket 20, i.e. from terminal holes 16b, c, d and e. Therefore, the socket 16 has two pairs of terminals connected to terminals of the signal and power output socket 20. The socket 18 has only one pair of terminals, namely terminals 18b and 18e which are connected to the signal and power socket 20.

It follows from the above description, that the connector of the embodiment has three signal input sockets 14, 16 and 18 each of which may be connected to a wall outlet which is connected to a single pair of signal conductors only. In addition, the sockets 14 and 16 are each connectable to a wall outlet having two pairs of signal conductors and for connecting these two pairs of signal conductors to an analog telephone through the signal and power output socket 20. Finally, the socket 14 is connectable to a wall socket having three pairs of signal conductors extending to it while being capable of connecting these three pairs through the socket 20 to an analog telephone.

Figure 4:
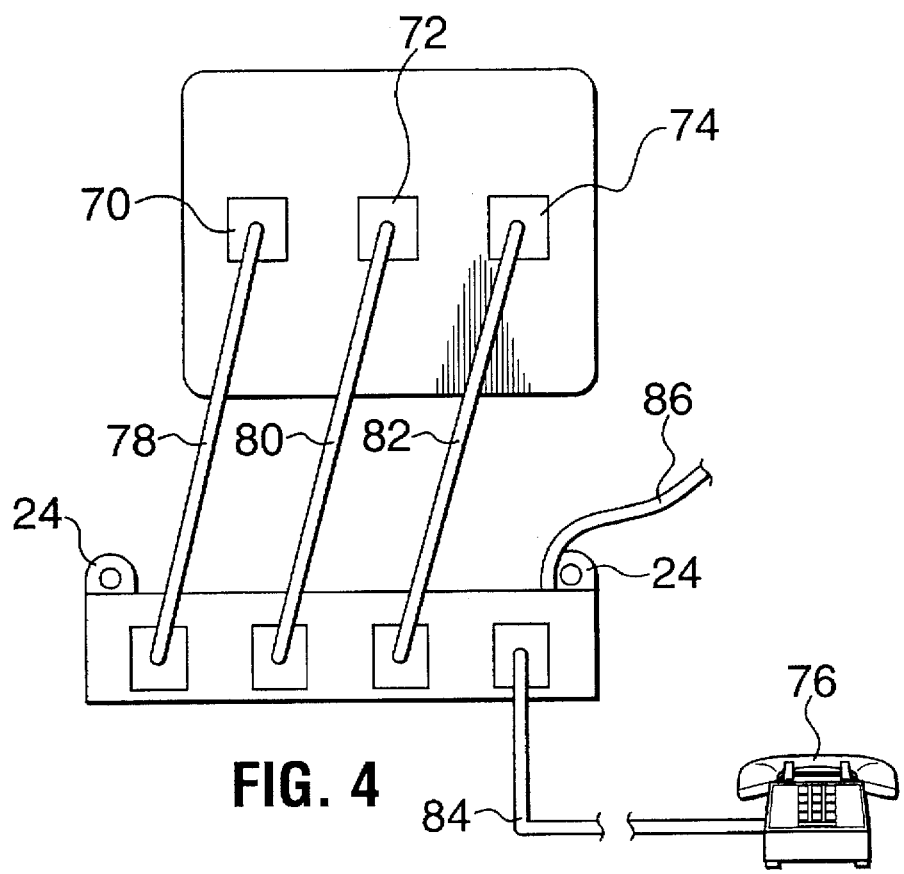
FIG. 4 is a diagrammatic view showing the connector of the first embodiment installed in operating position between wall jacks and telephone.

It follows therefore that, in use, the connector 10 may connect three wall outlets or sockets 70, 72 and 74 as shown in FIG. 4 to a telephone 76. The sockets 70, 72 and 74 are connected, respectively by cables 78, 80 and 82 to the sockets 14, 16 and 18 of the connector. The socket 70 may be, if desired, a three pair input socket in the wall for connection to the three pairs of conductors of the socket 14 as exemplified by the terminal holes 14a to f in FIGS. 2 and 3. Alternatively, the socket 70 may be connected to two pairs of incoming signal conductors or to only one pair of incoming signal conductors. The socket 72 may be connected to a single pair or two pairs of incoming signal conductors while the outlet 74 may only connect a single pair of incoming signal conductors to the socket 18.

Whichever combination of signal conductors reaches the outlets 70, 72 and 74 in a wall, the connector 10 is capable of connecting all of these signal pairs to the telephone 76 in a single cable 84 as shown in FIG. 4. Not only does this single cable convey all of the telecommunications signals, it also carries the power from a power cable 86 which is connected to power through the inlet port 28 to the set of rectangular terminals 1, 2 and 3 in the printed circuit board. Thus, the telephone 76, if it is carried upon a horizontal support surface, such as a desk or table, has only a single cable such as cable 84 extending from it across the horizontal surface. This cable then extends to the connector 10 which conveniently may be wall mounted in the vicinity of the outlet sockets 70, 72 and 74 or may even be allowed to hang freely from the conductors and cables.

As may be seen from the above embodiment therefore, the connector of the invention is usable for a large variety of combinations of signal pairs arriving at wall outlet sockets while also accommodating the power current required to operate the telephone.

In a modification of the embodiment described above (not shown) more or less of the signal jacks may be employed in a connector with a corresponding change as necessary in the number of terminal ports required for the common signal and power output 20.

Figure 5:
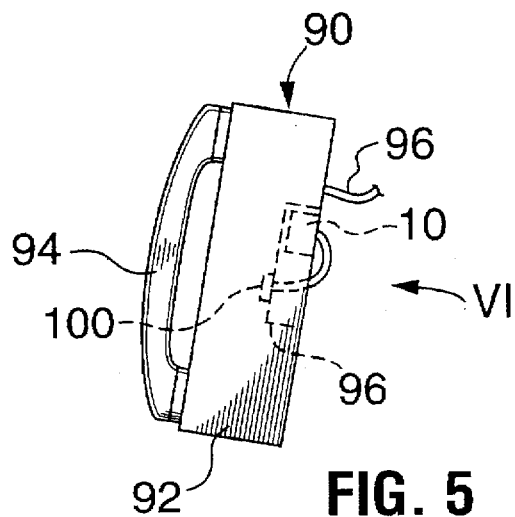
FIG. 5 is a diagrammatic side elevational view of a telephone and telephone line connector assembly mounted upon a wall.
Figure 6:
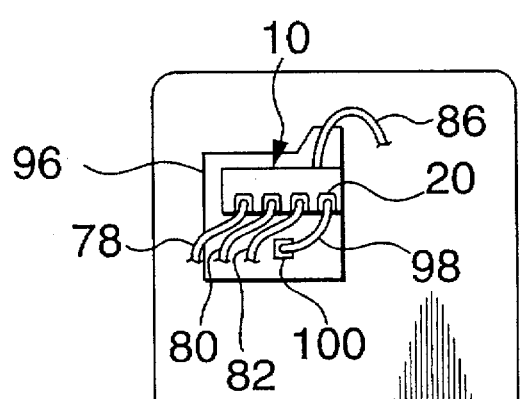
FIG. 6 is a rear view of the telephone and connector assembly taken in the direction of arrow VI in FIG. 5.

In a second embodiment as shown in FIGS. 5 and 6 a wall mounted telephone 90 has a base 92 mounted upon the wall, the base carrying a handset 94. A rear surface of the base 92 is provided with a recess 96 suitably formed to accommodate the connector 10 of the first embodiment. The connector 10 is located and may be secured within the recess 96 while being connected to the power cable 86 and to each of the conductor pairs 78, 80 and 82 from wall mounted outlets similar to those described in the first embodiment. The common signal and power socket 20 as shown by FIG. 6 is connected by a short cable 98 to the signal socket 100 of the telephone. Thus, as shown by the embodiment of FIGS. 5 and 6, a wall mounted telephone may be connected to a variety of incoming pairs of signal conductors in the manner described with reference to the first embodiment while only requiring to be supplied by a single cable to its inlet jack 98, this cable conveying both the telecommunications signals and the power supply to the telephone.

What is claimed is:

1. In combination, a telephone base and a telephone line connector for in-series insertion between the telephone base and a plurality of telephone outlet sockets, the telephone base having means for carrying the telephone line connector; and the telephone line connector comprising a housing, a common signal and power output socket and a plurality of signal input sockets carried by the housing, the housing also carrying power input terminals electrically interconnected with a pair of terminals of the common signal and power output socket, the common signal and power output socket also having a plurality of pairs of signal output terminals each of which is interconnected with a pair of signal input terminals of each of the signal input sockets and with at least two of these pairs of signal output terminals each electrically interconnected with an individual of a corresponding number of terminal pairs of at least one chosen signal input socket, the common signal and power output socket being connectable to a common signal and power output socket of the telephone base.

2. A combination according to claim 1 wherein the telephone base is formed with a recess for accommodating the telephone line connector.

\* \* \* \* \*